US012687745B2

(12) United States Patent
Liu et al.

(10) Patent No.: US 12,687,745 B2
(45) Date of Patent: Jul. 21, 2026

(54) DIGITAL CONTROL METHOD FOR LASER POWER STABILIZATION

(71) Applicant: NATIONAL TIME SERVICE CENTER, THE CHINESE ACADEMY OF SCIENCES, Xi'an City (CN)

(72) Inventors: Guobin Liu, Xi'an City (CN); Erwei Li, Xi'an City (CN); Qianjin Ma, Xi'an City (CN); Enxue Yun, Xi'an City (CN)

(73) Assignee: NATIONAL TIME SERVICE CENTER, THE CHINESE ACADEMY OF SCIENCES, Xi'an City (CN)

( * ) Notice: Subject to any disclaimer, the term of this patent is extended or adjusted under 35 U.S.C. 154(b) by 205 days.

(21) Appl. No.: 18/795,469

(22) Filed: Aug. 6, 2024

(65) Prior Publication Data

US 2025/0172834 A1 May 29, 2025

(30) Foreign Application Priority Data

Nov. 24, 2023 (CN) .......................... 202311579798.5

(51) Int. Cl.
G02F 1/11 (2006.01)
G02B 27/28 (2006.01)
(52) U.S. Cl.
CPC ............ G02F 1/113 (2013.01); G02B 27/283 (2013.01); G02B 27/286 (2013.01)

(58) Field of Classification Search
CPC ...... G02F 1/113; G02B 27/283; G02B 27/286
See application file for complete search history.

(56) References Cited

U.S. PATENT DOCUMENTS 7,742,173 B2 * 6/2010 Yun ..................... G01N 21/4795
                                                    356/479
8,199,398 B2 * 6/2012 Fermann ............. H01S 3/08059
                                                    359/341.1

(Continued)

FOREIGN PATENT DOCUMENTS

CN        112394638 A  *  2/2021  ......... G05B 13/0275
CN        219576192 U  *  8/2023

*Primary Examiner* — Bao-Luan Q Le

(74) *Attorney, Agent, or Firm* — WCF IP

(57) ABSTRACT

Embodiment of this application relate to a digital control method for laser power stabilization. In the embodiments of this application, based on conservation of optical power, that is, the sum of inner-loop optical power and outer-loop optical power is input optical power, a digital proportion integration differentiation (PID) control method combining optical loops and temperature compensation is adopted, which can optimize and adjust a PID control algorithm parameter in a large range in time, make up for the defect that an acousto-optic modulator (AOM) is sensitive to temperature, and meet stability requirements for high anti-interference ability, high precision and high stability of laser power. In addition, in the method, the target light intensity is set by means of a digital constant, thereby getting rid of the dependence on a high-performance voltage reference, reducing costs, and reducing sensitivity of a controller to an environmental parameter, thereby further enhancing a control ability.

7 Claims, 3 Drawing Sheets

(56)                     References Cited

U.S. PATENT DOCUMENTS

2007/0236700 A1*  10/2007  Yun ................... G01N 21/4795
                                                        356/477
2009/0201575 A1*   8/2009  Fermann ............ H01S 3/06754
                                                        359/341.32
2023/0273323 A1*   8/2023  Hirosawa ............... G01S 17/34
                                                        356/5.09
2024/0094360 A1*   3/2024  Piggott ................ G01S 7/4917

* cited by examiner

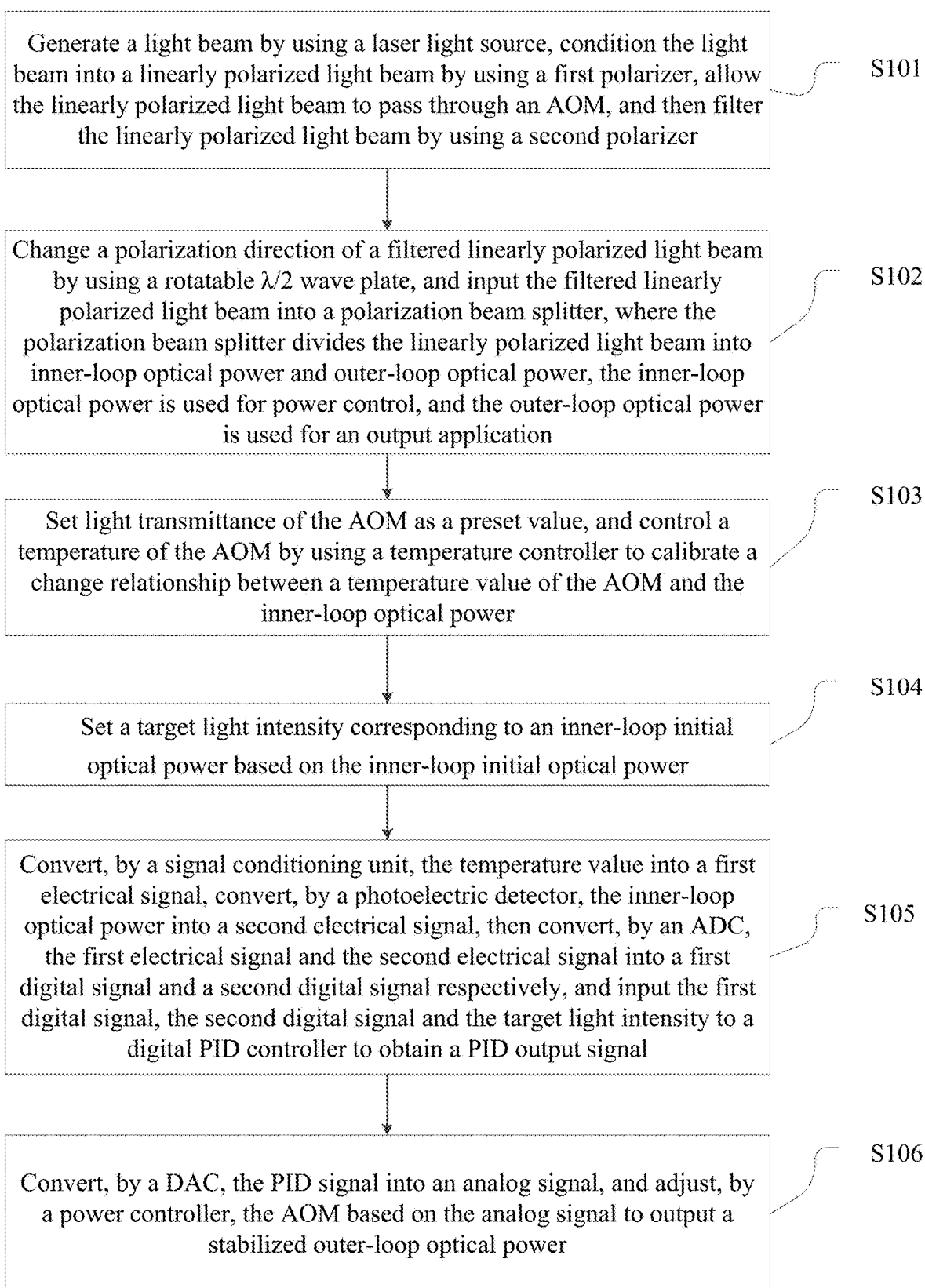

Generate a light beam by using a laser light source, condition the light beam into a linearly polarized light beam by using a first polarizer, allow the linearly polarized light beam to pass through an AOM, and then filter the linearly polarized light beam by using a second polarizer

S101

Change a polarization direction of a filtered linearly polarized light beam by using a rotatable λ/2 wave plate, and input the filtered linearly polarized light beam into a polarization beam splitter, where the polarization beam splitter divides the linearly polarized light beam into inner-loop optical power and outer-loop optical power, the inner-loop optical power is used for power control, and the outer-loop optical power is used for an output application

S102

Set light transmittance of the AOM as a preset value, and control a temperature of the AOM by using a temperature controller to calibrate a change relationship between a temperature value of the AOM and the inner-loop optical power

S103

Set a target light intensity corresponding to an inner-loop initial optical power based on the inner-loop initial optical power

S104

Convert, by a signal conditioning unit, the temperature value into a first electrical signal, convert, by a photoelectric detector, the inner-loop optical power into a second electrical signal, then convert, by an ADC, the first electrical signal and the second electrical signal into a first digital signal and a second digital signal respectively, and input the first digital signal, the second digital signal and the target light intensity to a digital PID controller to obtain a PID output signal

S105

Convert, by a DAC, the PID signal into an analog signal, and adjust, by a power controller, the AOM based on the analog signal to output a stabilized outer-loop optical power

DIGITAL CONTROL METHOD FOR LASER POWER STABILIZATION

CROSS REFERENCE TO RELATED APPLICATION

This patent application claims the benefit and priority of Chinese Patent Application No. 2023115797985, filed with the China National Intellectual Property Administration on Nov. 24, 2023, the disclosure of which is incorporated by reference herein in its entirety as part of the present application.

TECHNICAL FIELD

Embodiments of the present disclosure relate to the technical field of quantum sensing and precision measurement, and in particular, to a digital control method for laser power stabilization.

BACKGROUND

Stability of laser power has an important impact on performance of an atomic clock, an atomic magnetometer and an atomic spin gyroscope. At present, there have been many studies on laser power stability control. Researchers implement high-precision laser power stability control with reference to feedback control technology by means of actuators that can change an intensity of transmitted light, such as a liquid crystal variable phase retarder, an electro-optic modulator, an acousto-optic modulator (AOM) and a magneto-optic modulator.

However, in related technologies, a degree of digitization is low, the control is not flexible enough, and control effects of an inner loop and an outer loop are significantly different. A method for setting a desired value of optical power by using an analog voltage reference source makes the desired value fluctuate because of a fluctuation of the reference source, and makes it difficult to change the power during control. In addition, a drift caused by temperature is not compensated into a control loop. An analog proportional-integral (PI) circuit is used to form feedback control, but when a laser source changes greatly, a steady state cannot be entered in time. Moreover, a pure analog circuit would be subjected to temperature drift with the temperature, and tuning a proportion integration differentiation (PID) parameter by means of an analog parameter has difficulty in adjustment to an optimal state. As a result, the stability of optical power control is limited and an anti-interference ability is poor.

SUMMARY

In order to overcome the shortcomings of the prior art, the present disclosure provides a digital control method for laser power stabilization, to solve the problems existing in the prior art that a method for setting a desired value of optical power by using an analog voltage reference source makes the desired value fluctuate because of a fluctuation of the reference source, and make it difficult to change the power during control.

According to an embodiment of the present disclosure, a digital control method for laser power stabilization is provided. The method includes:

generating a light beam by using a laser light source, conditioning the light beam into a linearly polarized light beam by using a first polarizer, allowing the linearly polarized light beam to pass through an AOM, and then filtering the linearly polarized light beam by using a second polarizer;

changing a polarization direction of a filtered linearly polarized light beam by using a rotatable $\lambda/2$ wave plate, and inputting the filtered linearly polarized light beam into a polarization beam splitter, where the polarization beam splitter divides the linearly polarized light beam into inner-loop optical power and outer-loop optical power, the inner-loop optical power is used for power control, and the outer-loop optical power is used for an output application;

setting light transmittance of the AOM as a preset value, and controlling a temperature of the AOM by using a temperature controller to calibrate a relationship between a temperature value of the AOM and the inner-loop optical power;

setting a target light intensity corresponding to an inner-loop initial optical power based on the inner-loop initial optical power;

converting, by a signal conditioning unit, the temperature value into a first electrical signal, converting, by a photoelectric detector, the inner-loop optical power into a second electrical signal, then converting, by an analog to digital converter (ADC), the first electrical signal and the second electrical signal into a first digital signal and a second digital signal respectively, and inputting the first digital signal, the second digital signal and the target light intensity to a digital proportion integration differentiation (PID) controller to obtain a PID output signal; and converting, by a digital to analog converter (DAC), the PID output signal into an analog signal, and adjusting, by a power controller, the AOM based on the analog signal to output a stabilized outer-loop optical power.

A splitting ratio of the inner-loop optical power to the outer-loop optical power is 0.01-1.

The step of setting light transmittance of the AOM as a preset value, and controlling a temperature of the AOM by using a temperature controller to calibrate a relationship between a temperature value of the AOM and the inner-loop optical power includes:

setting transmitted light power of the AOM, controlling the temperature of the AOM in an operating environment temperature range by using the temperature controller, and fitting the relationship between the temperature value of the AOM and the inner-loop optical power by means of a least-square method.

The relationship between the temperature value of the AOM and the inner-loop optical power is:

$$P_{IL}(T)=P_0+\delta_{AOM}(T),$$

where T is the temperature, $P_{IL}(T)$ is the inner-loop optical power when the temperature is T, $P_0$ is a target light intensity of the inner-loop optical power when transmittance is k, k is zero-order transmittance through the AOM, and $\delta_{AOM}(T)$ is a disturbance of the temperature to the inner-loop optical power through the AOM.

The step of setting a target light intensity corresponding to an inner-loop initial optical power based on the inner-loop initial optical power includes:

setting the target light intensity $P0=k*PIL0$ based on the inner-loop initial optical power $P_{IL0}$ by means of a power setting unit; and setting a value of k based on an application environment, where k is in a value range of 0.05-0.95, and when k=1, the target light intensity is the maximum.

The step of converting, by a signal conditioning unit, the temperature value into a first electrical signal, converting, by a photoelectric detector, the inner-loop optical power into a second electrical signal, then converting, by an ADC, the first electrical signal and the second electrical signal into a first digital signal and a second digital signal respectively, and inputting the first digital signal, the second digital signal and the target light intensity to a digital PID controller to obtain a PID output signal includes:

converting the temperature value sent by the temperature sensor into the first electrical signal by using the signal conditioning unit, and converting the inner-loop optical power into the second electrical signal by using the photoelectric detector;

converting the first electrical signal and the second electrical signal into the first digital signal and the second digital signal by using the ADC;

parsing and filtering the first digital signal and the second digital signal; and inputting the first digital signal, the second digital signal and the target light intensity to the digital PID controller to obtain the PID output signal.

The step of converting, by a DAC, the PID output signal into an analog signal, and adjusting, by a power controller, the AOM based on the analog signal to output a stabilized outer-loop optical power further includes:

if the temperature of the AOM changes, compensating, by the AOM, for the target light intensity based on the analog signal, so as to eliminate $\delta_{AOM}(T)$, to output the outer-loop optical power $P_{OL}=k*P-P_{IL}(T)+\delta_{AOM}(T)=k*P-P_0$ (constant).

The technical solutions provided in the embodiments of the present disclosure may have the following beneficial effects:

In the embodiments of the present disclosure, by the above digital control method for laser power stabilization, on one hand, based on conservation of optical power, that is, the sum of inner-loop optical power and outer-loop optical power is input optical power, a digital PID control method combining optical loops and temperature compensation is adopted, which can optimize and adjust a PID control algorithm parameter in a large range in time, make up for the defect that an AOM is sensitive to temperature, and meet stability requirements for high anti-interference ability, high precision and high stability of laser power. On the other hand, the target light intensity is set by means of a digital constant, thereby getting rid of the dependence on a high-performance voltage reference, reducing costs, and reducing sensitivity of a controller to an environmental parameter, thereby further enhancing a control ability.

BRIEF DESCRIPTION OF THE DRAWINGS

The accompanying drawings herein are incorporated into and constitute a part of the description, illustrate embodiments consistent with the present disclosure, and are used together with the description to explain the principles of the present disclosure. Apparently, the accompanying drawings in the following description show merely some embodiments of the present disclosure, and those of ordinary skill in the art may still derive other accompanying drawings from these accompanying drawings without creative efforts.

FIG. 1 is a step diagram of a digital control method for laser power stabilization according to an exemplary embodiment of the present disclosure;

Figure 2:
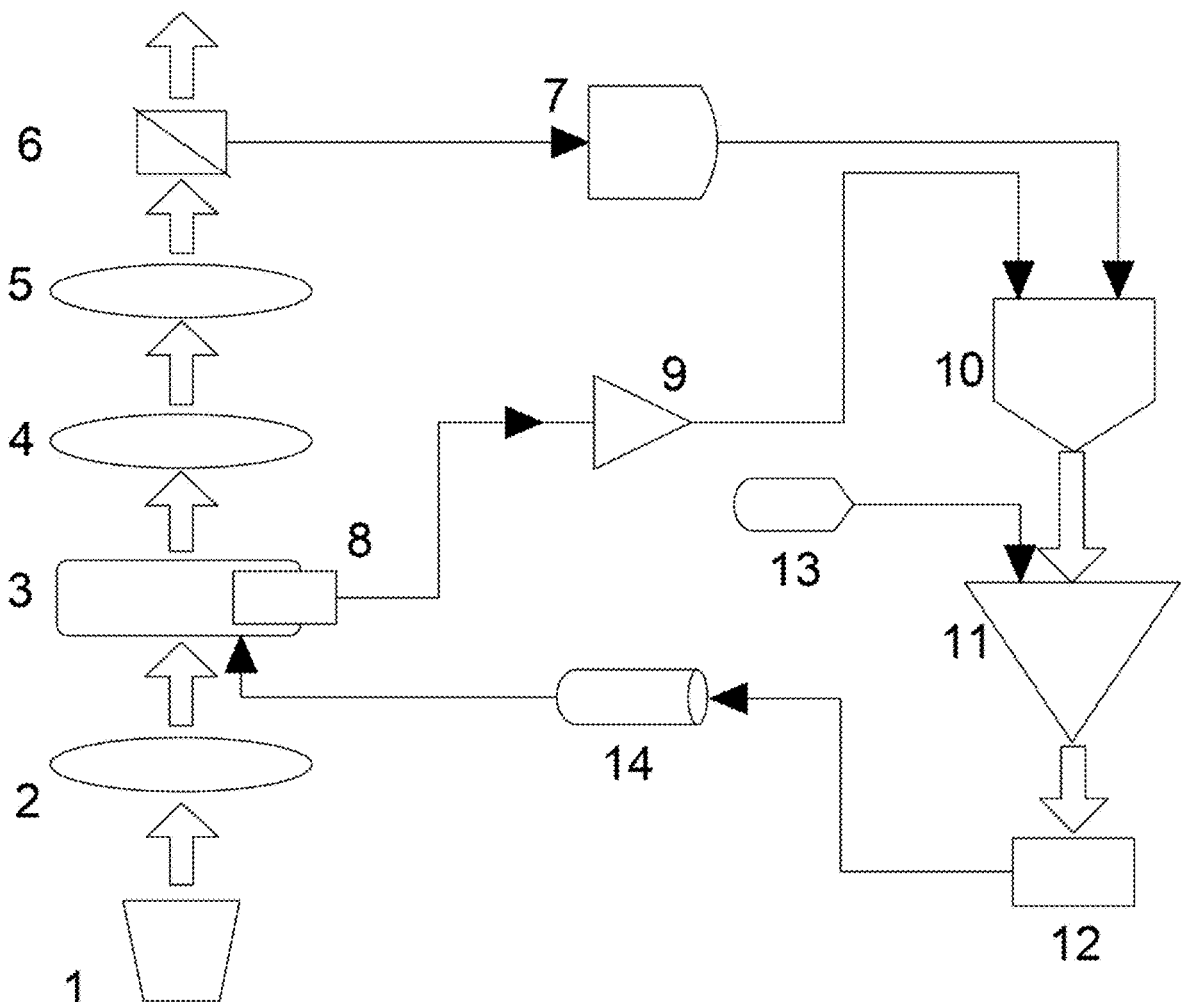
FIG. 2 is a schematic diagram of a framework of a digital control method for laser power stabilization according to an exemplary embodiment of the present disclosure.

In the figures: 1. Laser light source; 2. First polarizer; 3. AOM; 4. Second polarizer; 5. λ/2 wave plate; 6. Polarization beam splitter; 7. Photoelectric detector; 8. Temperature sensor; 9. Signal conditioning unit; 10. ADC; 11. Digital PID controller; 12. DAC; 13. Power setting unit; 14. Power controller.

DETAILED DESCRIPTION OF THE
EMBODIMENTS

The illustrative implementations are described more comprehensively below with reference to the accompanying drawings. However, the exemplary implementations can be implemented in various forms and should not be construed as being limited to examples described herein. On the contrary, these implementations are provided such that the present disclosure is more comprehensive and complete, and fully conveys the concept of the exemplary implementations to those skilled in the art. The described features, structures, or characteristics may be incorporated into one or more implementations in any suitable manner.

In addition, the accompanying drawings are merely schematic illustrations the embodiments of the present disclosure, and are not necessarily drawn to scale. Same reference signs in the figures indicate same or similar parts, and thus their detailed descriptions are omitted. Some of the block diagrams shown in the accompanying drawings are functional entities, and do not necessarily correspond to physically or logically independent entities.

This exemplary implementation first provides a digital control method for laser power stabilization. As shown in FIG. 1, the digital control method for laser power stabilization may include steps S101 to S106.

Step S101: Generate a light beam by using a laser light source, condition the light beam into a linearly polarized light beam by using a first polarizer, allow the linearly polarized light beam to pass through an AOM, and then filter the linearly polarized light beam by using a second polarizer.

Step S102: Change a polarization direction of a filtered linearly polarized light beam by using a rotatable λ/2 wave plate, and input the filtered linearly polarized light beam into a polarization beam splitter, where the polarization beam splitter divides the linearly polarized light beam into inner-loop optical power and outer-loop optical power, the inner-loop optical power is used for power control, and the outer-loop optical power is used for an output application.

Step S103: Set light transmittance of the AOM as a preset value, and control a temperature of the AOM by using a temperature controller to calibrate a relationship between a temperature value of the AOM and the inner-loop optical power.

Step S104: Set a target light intensity corresponding to an inner-loop initial optical power based on the inner-loop initial optical power.

Step S105: Convert, by a signal conditioning unit, the temperature value into a first electrical signal, convert, by a photoelectric detector, the inner-loop optical power into a second electrical signal, then convert, by an ADC, the first electrical signal and the second electrical signal into a first digital signal and a second digital signal respectively, and input the first digital signal, the second digital signal and the target light intensity to a digital PID controller to obtain a PID output signal.

Step S106: Convert, by a DAC, the PID output signal into an analog signal, and adjusting, by a power controller, the AOM based on the analog signal to output a stabilized outer-loop optical power.

By the above digital control method for laser power stabilization, on one hand, based on conservation of optical power, that is, the sum of inner-loop optical power and outer-loop optical power is input optical power, a digital PID control method combining optical loops and temperature compensation is adopted, which can optimize and adjust a PID control algorithm parameter in a large range in time, make up for the defect that an AOM is sensitive to temproportion with inner-loop optical power $P_{IL}$ and outer-loop optical power $P_{OL}$, where $P_{OL}/P_{IL}(0.01-0.5)$, $P_{OL}$ is beam power outside a control loop, which is used for an application scenario such as pumping or detection, $P_{IL}$ is beam power inside the control loop, which is used for power control, and $P=P_{OL}+P_{IL}$.

In step S103, light transmittance of the AOM is set as a preset value, and a temperature of the AOM is controlled by using the temperature controller to calibrate a relationship between a temperature value of the AOM and the inner-loop optical power.

Specifically, the transmitted light power of the AOM is set as k*P (the physical meaning of k is zero-order transmittance through the AOM), and a disturbance law of the temperature of the AOM on the inner-loop optical power is calibrated, with calibration data in a calibration shown in Table 1:

| Temperature (° C.) | 15.0 | 17.5 | 20.0 | 22.5 | 25.0 | 27.5 |
|---|---|---|---|---|---|---|
| Inner loop power (arb.uniT) | 0.01449 | 0.04058 | 0.06087 | 0.02899 | 0.01507 | 0.04405 |
| Temperature (° C.) | | 30.0 | 32.5 | 35.0 | 37.5 | 40.0 |
| Inner loop power (arb.uniT) | | 0.05942 | 0.03188 | 0.01362 | 0.04058 | 0.06174 | perature, and meet stability requirements for high anti-interference ability, high precision and high stability of laser power. On the other hand, the target light intensity is set by means of a digital constant, thereby getting rid of the dependence on a high-performance voltage reference, reducing costs, and reducing sensitivity of a controller to an environmental parameter, thereby further enhancing a control ability.

Each step of the above digital control method for laser power stabilization in this exemplary implementation is described in more detail below with reference to FIGS. 1 to 3.

In step S101, a light beam is generated by using the laser light source, the light beam is conditioned into a linearly polarized light beam by using the first polarizer, the linearly polarized light beam passes through the AOM, and then the linearly polarized light beam is filtered by using the second polarizer.

Specifically, the laser light source generates a light source with a frequency required for an experiment, with power set to P. The light beam is conditioned into linearly polarized light by the first polarizer, and a first linearly polarized light beam passes through the AOM and then passes through the second polarizer to filter out other polarized light that may be caused by the AOM.

In step S102, a polarization direction of a filtered linearly polarized light beam is changed by using the rotatable λ/2 wave plate, and the filtered linearly polarized light beam is input into the polarization beam splitter, where the polarization beam splitter divides the linearly polarized light beam into inner-loop optical power and outer-loop optical power, the inner-loop optical power is used for power control, and the outer-loop optical power is used for an output application.

Specifically, the polarization direction of output light is changed by rotating the λ/2 wave plate, so that light emitted by the polarization beam splitter (PBS) is divided into two beams of orthogonal polarized light according to a certain The law of change of the inner-loop optical power with the temperature of the AOM is fitted by the least-square method is as follows:

$$P_{IL}(T) = P_0 + \delta_{AOM}(T),$$

where T is the temperature, $P_{IL}(T)$ is the inner-loop optical power when the temperature is T, $P_0$ is a target light intensity of the inner-loop optical power when transmittance is k, k is zero-order transmittance through the AOM, and $\delta_{AOM}(T)$ is a disturbance of the temperature to the inner-loop optical power through the AOM.

In step S104, a target light intensity corresponding to an inner-loop initial optical power is set based on the inner-loop initial optical power.

Specifically, based on inner-loop initial optical power $P_{IL0}$ (inner-loop light intensity when k=1), $P_0=k*P_{IL0}$ (depending on an application environment, the value range of k is 0.05-0.95) is set as a target value (that is, the target light intensity).

Power setting includes two modes: manual setting and automatic setting. The manual setting may be implemented by inputting a desired value (that is, a target light intensity) in the voltage range of the photoelectric detector based on experimental requirements. The automatic setting is implemented by setting an initial light intensity of 1% to 99% based on a different initial light intensity I.

In steps S105 and S106, the signal conditioning unit converts the temperature value into a first electrical signal, the photoelectric detector converts the inner-loop optical power into a second electrical signal, then the ADC converts the first electrical signal and the second electrical signal into a first digital signal and a second digital signal respectively, and the first digital signal, the second digital signal and the target light intensity are input to the digital PID controller to obtain a PID output signal. The DAC converts the PID output signal into an analog signal, and the power controller adjusts the AOM based on the analog signal to output a stabilized outer-loop optical power.

Specifically, $P_{IL}$ is converted into an electrical signal by the photoelectric detector, which is converted into a digital signal by the ADC, and by comparison with a set light intensity constant $P_0$, an error signal is calculated by means of a PID algorithm. Then a PID output signal is output based on the error signal and is converted into a power control signal by the DAC. If a desired inner-loop value (that is, the target light intensity) is not corrected, that is, the target value is set to change with the temperature, the $\delta_{AOM}(T)$ can be eliminated, and the outer-loop optical power $P_{OL}=k^*P-P_{IL}(T)+\delta_{AOM}(T)=k^*P-P_0$ changes with the temperature of the AOM. Therefore, the disturbance of the outer-loop optical power varying with the temperature is compensated for.

Figure 3:
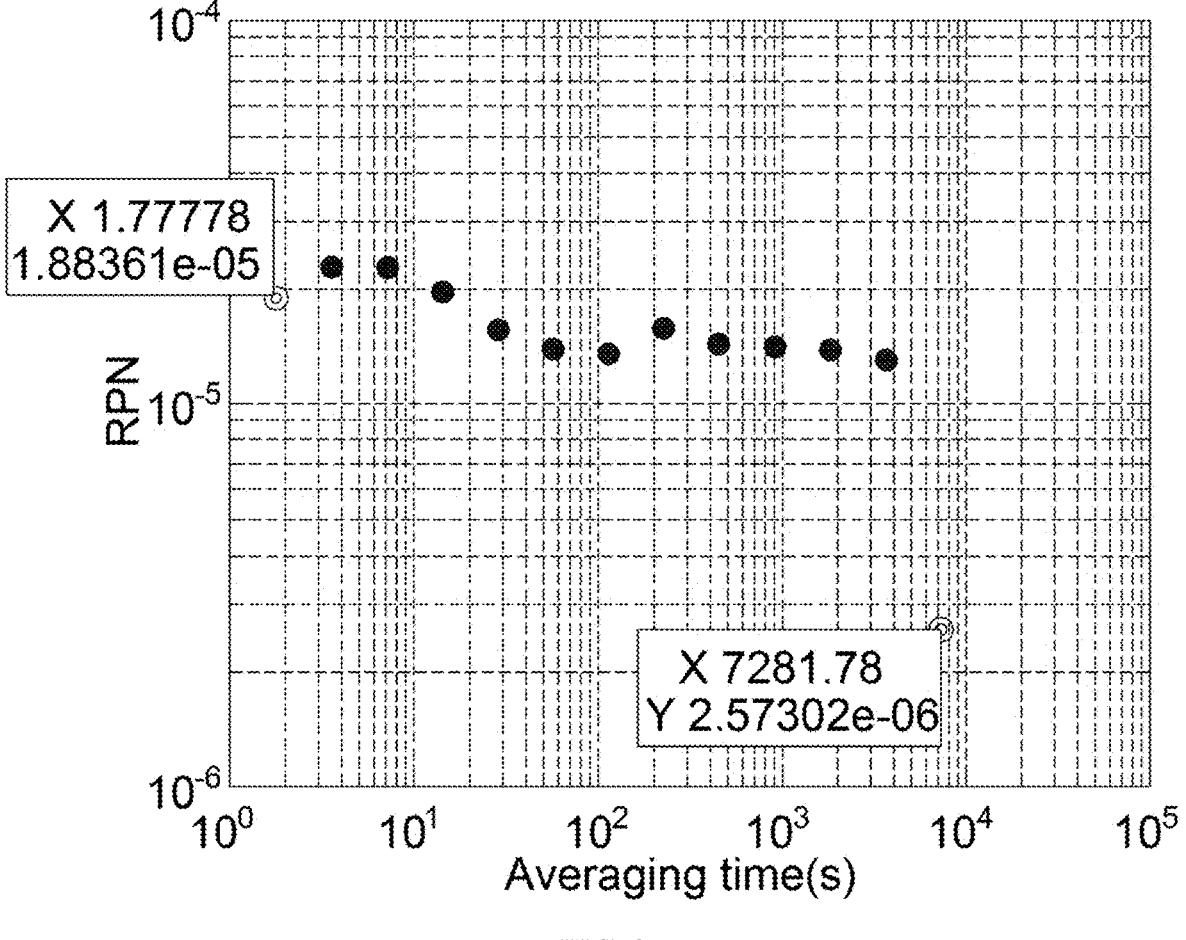
FIG. 3 is diagram showing a relationship between stability at one second and long-term stability according to an exemplary embodiment of the present disclosure.

In an embodiment, FIG. 2 is a schematic diagram of a framework of a digital control method for laser power stabilization. A laser light source is configured to generate light with a frequency required in experimental research and application. A first polarizer is configured to condition incident light from the laser light source into linearly polarized light. An AOM is configured to continuously control a beam intensity by adjusting light transmittance based on an amplitude of a driving signal of a power controller. A second polarizer is configured to filter out other unnecessary polarized light that may be generated in a light beam that has passed through the AOM. A λ/2 wave plate is configured to adjust a polarization direction of light and a splitting ratio of emergent light. A polarization splitting prism is configured to divide the light beam into two beams of orthogonal light. One beam of light is configured to detect and lock the laser power, and the other beam of light is used as pump light or detection light after undergoing laser power stabilization. The light intensities of the two beams of light are adjusted by the λ/2 wave plate. A photoelectric detector is configured to convert a light intensity signal into an electrical signal. A temperature controller is configured to control the temperature of the AOM. A signal conditioning unit is configured to convert the temperature into a voltage signal. An ADC is configured to convert the voltage and a first electrical signal of the photoelectric detector into a digital signal. Digital PID is implemented by a processor (generally including but not limited to a single-chip microcomputer, a programmable gate array (FPGA), a digital signal processor (DSP) and other processing units with logic operation and storage functions), and the voltage and the temperature signal of the photoelectric detector are parsed and filtered and then used as inputs of a digital PID controller to generate a digital error signal through calculation. A DAC is configured to receive the digital error signal from the digital PID controller, and then convert the error signal into an analog signal to control the power controller. The power controller is configured to generate a high-frequency sinusoidal signal with a continuously changing amplitude and continuously control transmission efficiency of the AOM.

In a specific embodiment, it is set that k=0.95, $P_0=0.95^*P_{IL0}$. A result of a simulation experiment is shown in FIG. 3. In FIG. 3, measurement is performed with a temperature control accuracy of 1° C. If the temperature control accuracy is improved, the performance will be further improved.

The power controller and AOM are configured to adjust the laser power, and a temperature sensor is configured to obtain an AOM temperature signal in real time to dynamically adjust a controlled target value, so as to make the other applied light source more stable. The laser power is adjusted by means of a PID control algorithm to stabilize the light intensity, so that a method for automatically setting a desired value by using a digital constant without an analog voltage reference source is implemented, thereby avoiding power drift caused by a fluctuation of the voltage reference source, facilitating application, and greatly improving performance of related experiments. It can be seen that the stability at one second reaches the order of $10^{-5}$ and the long-term stability reaches the order of $10^{-6}$; and stronger robustness and superior anti-interference performance are achieved.

In the present application, the digital PID is used for control, and the optimal tuning can be performed according to a tuning theory. The flexible setting of a flexible control cycle effectively suppresses noise of a target frequency band. In the present application, a digital constant is used to set power instead of an analog voltage reference, which is not affected by an environment and has no fluctuation. In the present application, an AOM temperature measurement function is introduced, and the desired value of control is corrected in real time by means of a temperature action law to compensate for the temperature error, so as to ensure the stability of the outer-loop optical power.

By the above digital control method for laser power stabilization, on one hand, based on conservation of optical power, that is, the sum of inner-loop optical power and outer-loop optical power is input optical power, a digital PID control method combining optical loops and temperature compensation is adopted, which can optimize and adjust a PID control algorithm parameter in a large range in time, make up for the defect that an AOM is sensitive to temperature, and meet stability requirements for high anti-interference ability, high precision and high stability of laser power. On the other hand, the target light intensity is set by means of a digital constant, thereby getting rid of the dependence on a high-performance voltage reference, reducing costs, and reducing sensitivity of a controller to an environmental parameter, thereby further enhancing a control ability.

In the description of this description, descriptions with reference to the terms such as "an embodiment", "some embodiments", "example", "specific example" or "some examples" mean that specific features, structures, materials or characteristics described with reference to the embodiment or example are included in at least one embodiment or example of the present disclosure. In this description, the schematic expression of the above terms is not necessarily directed to the same embodiment or example. In addition, the specific features, structures, materials or characteristics described may be combined in any suitable manner in any one or more embodiments or examples. In addition, different embodiments or examples described in this description may be joined and combined by those skilled in the art.

Those skilled in the art may easily figure out other implementation solutions of the present disclosure after considering the description and practicing the disclosure disclosed herein. The present disclosure is intended to cover any variations, purposes, or adaptive changes of the present disclosure. Such variations, purposes, or applicable changes follow the general principle of the present disclosure and include common knowledge or conventional technical means in the technical field which is not disclosed in the present disclosure. The description and examples are merely considered as illustrative, and the real scope and spirit of the present disclosure are pointed out by the appended claims.

What is claimed is:

1. A digital control method for laser power stabilization, comprising:

generating a light beam by using a laser light source, conditioning the light beam into a linearly polarized light beam by using a first polarizer, allowing the linearly polarized light beam to pass through an acousto-optic modulator (AOM), and then filtering the linearly polarized light beam by using a second polarizer;

changing a polarization direction of a filtered linearly polarized light beam by using a rotatable λ/2 wave plate, and inputting the filtered linearly polarized light beam into a polarization beam splitter, wherein the polarization beam splitter divides the linearly polarized light beam into inner-loop optical power and outer-loop optical power, the inner-loop optical power is used for power control, and the outer-loop optical power is used for an output application;

setting light transmittance of the AOM as a preset value, and controlling a temperature of the AOM by using a temperature controller to calibrate a relationship between a temperature value of the AOM and the inner-loop optical power;

setting a target light intensity corresponding to an inner-loop initial optical power based on the inner-loop initial optical power;

converting, by a signal conditioning unit, the temperature value into a first electrical signal, converting, by a photoelectric detector, the inner-loop optical power into a second electrical signal, then converting, by an analog to digital converter (ADC), the first electrical signal and the second electrical signal into a first digital signal and a second digital signal respectively, and inputting the first digital signal, the second digital signal and the target light intensity to a digital proportion integration differentiation (PID) controller to obtain a PID output signal; and converting, by a digital to analog converter (DAC), the PID output signal into an analog signal, and adjusting, by a power controller, the AOM based on the analog signal to output a stabilized outer-loop optical power.

2. The digital control method for laser power stabilization according to claim 1, wherein a splitting ratio of the inner-loop optical power to the outer-loop optical power is 0.01-1.

3. The digital control method for laser power stabilization according to claim 1, wherein the step of setting light transmittance of the AOM as a preset value, and controlling a temperature of the AOM by using a temperature controller to calibrate a relationship between a temperature value of the AOM and the inner-loop optical power comprises:

setting transmitted light power of the AOM, controlling the temperature of the AOM in an operating environment temperature range by using the temperature controller, and fitting the relationship between the temperature value of the AOM and the inner-loop optical power by means of a least-square method.

4. The digital control method for laser power stabilization according to claim 3, wherein the relationship between the temperature value of the AOM and the inner-loop optical power is:

$$P_{IL}(T) = P_0 + \delta_{AOM}(T),$$

wherein T is the temperature, $P_{IL}(T)$ is the inner-loop optical power when the temperature is T, $P_0$ is a target light intensity of the inner-loop optical power when transmittance is k, k is zero-order transmittance through the AOM, and $\delta_{AOM}(T)$ is a disturbance of the temperature to the inner-loop optical power through the AOM.

5. The digital control method for laser power stabilization according to claim 3, wherein the step of setting a target light intensity corresponding to an inner-loop initial optical power based on the inner-loop initial optical power comprises:

setting the target light intensity P0=k*PIL0 based on the inner-loop initial optical power $P_{ILO}$ by means of a power setting unit; and setting a value of k based on an application environment, wherein k is in a value range of 0.05-0.95, and when k=1, the target light intensity is the maximum.

6. The digital control method for laser power stabilization according to claim 5, wherein the step of converting, by a signal conditioning unit, the temperature value into a first electrical signal, converting, by a photoelectric detector, the inner-loop optical power into a second electrical signal, then converting, by an ADC, the first electrical signal and the second electrical signal into a first digital signal and a second digital signal respectively, and inputting the first digital signal, the second digital signal and the target light intensity to a PID controller to obtain a PID output signal comprises:

converting the temperature value sent by the temperature sensor into the first electrical signal by using the signal conditioning unit, and converting the inner-loop optical power into the second electrical signal by using the photoelectric detector;

converting the first electrical signal and the second electrical signal into the first digital signal and the second digital signal by using the ADC;

parsing and filtering the first digital signal and the second digital signal; and inputting the first digital signal, the second digital signal and the target light intensity to the digital PID controller to obtain the PID output signal.

7. The digital control method for laser power stabilization according to claim 6, wherein the step of converting, by a DAC, the PID output signal into an analog signal, and adjusting, by a power controller, the AOM based on the analog signal to output a stabilized outer-loop optical power further comprises:

if the temperature of the AOM changes, compensating, by the AOM, for the target light intensity based on the analog signal, so as to eliminate $\delta_{AOM}(T)$, to output the outer-loop optical power $P_{OL}=k*P-P_{IL}(T)+\delta_{AOM}(T)=k*P-P_0$.

* * * * *